United States Patent Office 3,508,304
Patented Apr. 28, 1970

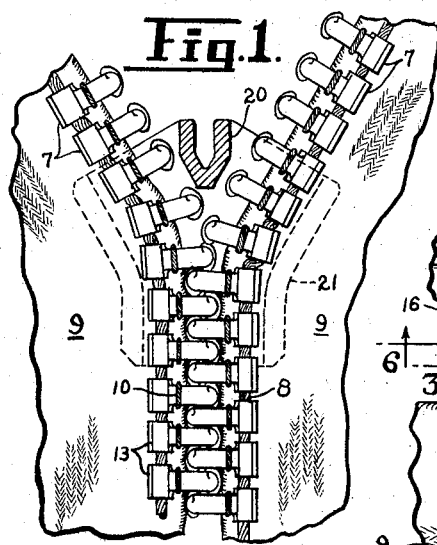
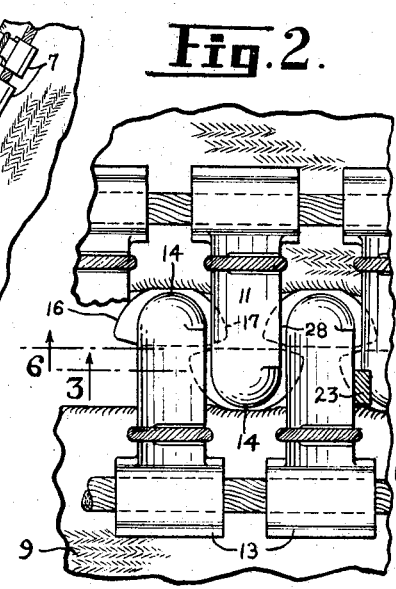
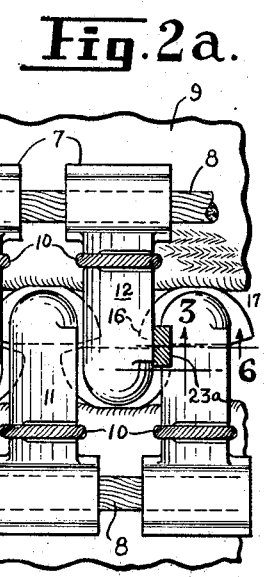
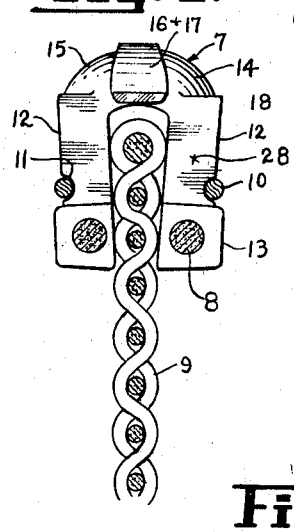
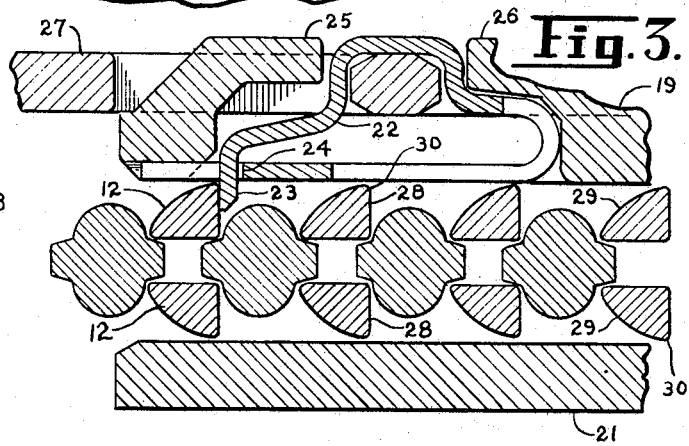
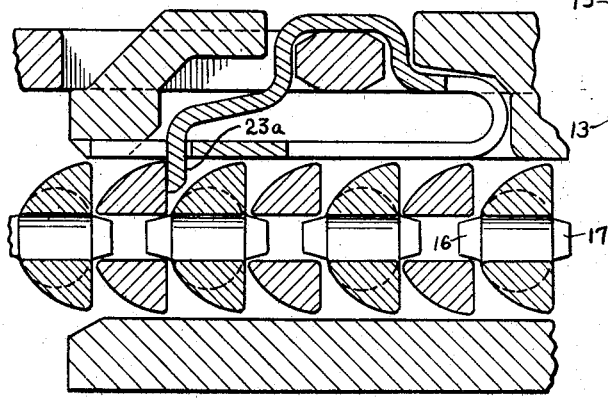
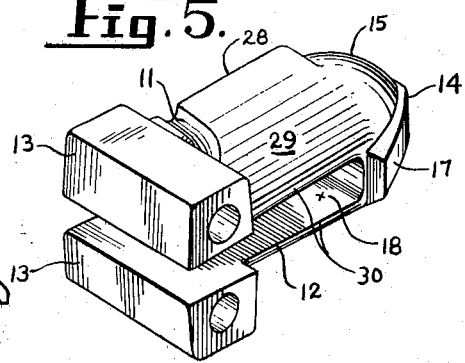

3,508,304
LOCKING TYPE SLIDE FASTENER
John Emerson Burbank, Middlebury, Conn., assignor to Scovill Manufacturing Company, Waterbury, Conn., a corporation of Connecticut
Filed May 14, 1968, Ser. No. 729,119
Int. Cl. A44b *19/06, 19/30*
U.S. Cl. 24—205.13                              1 Claim

ABSTRACT OF THE DISCLOSURE

An improvement in a slide fastener with a locking slider results from a novel shape of a portion of each fastener element to provide a perpendicular surface that will engage with the locking device to the best advantage while the area of the front face slopes away from such perpendicular surface to provide maximum ease of entrance of the locking prong between the fastener elements.

---

This invention relates to slide fasteners and particularly to a novel shape of the fastener elements to cooperate with a slider locking device to the best advantage.

It has hitherto been the practice to design locking sliders for slide fasteners so that the locking prong will engage with fastener elements which have been shaped to inter-engage with one another without regard to the manner in which they cooperate with the locking device. The locking prong must enter into a space between a pair of adjacent fastener elements which at best is limited. In the use of spring locking sliders, it is sometimes possible for the locking prong to strike on an outer surface of a fastener element and skip over the narrow space to the next element without locking. This is especially objectionable in the case of slide fasteners made of plastic material.

In the preferred form of the invention, the locking prong is arranged centrally of the slider where it may engage a fastener element on either side, and in this case the advantages of my invention are even more important than the case of a slider with a locking prong laterally offset to engage only one row of fastener elements.

An object of the invention, therefore, is to provide a novel shape of that portion of each fastener element which is engaged by the prong of the locking device. In accordance with the invention, a perpendicular surface faces toward the upper end of the fastener for maximum locking security with the locking prong and a front surface which slopes directly from that perpendicular surface downwardly toward the next fastener element. This prevents the locking prong from skipping over the elements and provides for maximum ease of entering of the locking prong into the space between elements even along the center line of the fastener where the interengaged elements are quite close together. Another advantage is that in the case of spring locking sliders, a weaker spring may be used. Other objects and advantages will hereinafter more fully appear.

In the accompanying drawings, I have shown for purposes of illustration, two embodiments which the invention may assume in practice. In these drawings:

FIG. 1 is a front view of a portion of a slide fastener with the slider indicated in outline;

FIG. 2 is a front view on an enlarged scale showing a small section of the slide fastener with a laterally offset locking prong in section;

FIG. 2a is a view like FIG. 2 with a centrally arranged locking prong;

FIG. 3 is a longitudinal section through a portion of a slide fastener with the slider in place, taken along line 3—3 of FIG. 2;

FIG. 4 is a transverse cross section of one of the fastener stringers;

FIG. 5 is a detail perspective view of one of the fastener elements; and

FIG. 6 is a longitudinal central section on line 6—6 of FIG. 2a.

While the invention may be applicable to various types of slide fasteners, it is particularly useful with a molded plastic fastener stringer of the type shown in the pending application of Cuckson S.N. 582,918, filed Sept. 29, 1966, now Patent No. 3,414,948. As shown in that application, each of the fastener stringers have rows of uniformly spaced fastener elements 7 joined together with small cords 8 and attached to tapes 9 by sewing threads 10 engaging in grooves 11. Each fastener element is of generally U-shape, having stem portions 12 straddling the edge of a tape 9, base or heel portions 13 molded around the cords 8, and a head portion generally designated 14. Each head portion has a rounded end surface 15 resulting from the fact that it was made from a strip which was first molded flat and then bent to U-shape. A pair of projections 16 and 17 on opposite sides of each head 14 are shaped to engage behind each other in the space indicated at 18 between the stem portions 12.

The lock slider may be of any known type but the invention is especially advantageous with an automatic or spring lock slider. The slider indicated in FIG. 3 has a front wing 19 joined by a neck 20 to a back wing 21. A spring locking element 22 has a locking prong 23 which extends through a hole 24 in the front wing 19. This locking member 22 is mounted between lugs 25 and 26 and is lifted out of locking engagement automatically when the slider is operated by the pull tab 27. When released, the locking prong 23 springs inwardly to engage between a pair of fastener elements. As seen in FIGS. 2 and 3, this locking prong is located to one side of the longitudinal center line so as to engage close to but at one side of the head 14 of the particular fastener element against which it locks. However, a stronger lock is obtained with a locking prong 23a as seen in FIGS. 2a and 6 arranged along the center line of the fastener.

The special shape given to that portion of the fastener element engaged by the locking prong is best indicated in FIGS. 3 and 5. Even where the lock operates on only one row of fastener elements and on one side of the fastener, both sides, as well as both rows of elements are shaped alike for the sake of symmetry and for interchangeability of the stringers. Of course, if desired, only that particular section which cooperates wth the lock need have the special novel shape. Each of the stem portions 12 between the head 14 and heel portions 13 has an upwardly facing perpendicular surface 28 to engage squarely with the locking prong 23 and a front surface 29 which immediately slopes inwardly and downwardly from a comparatively sharp corner 30 at the perpendicular surface 28, such sloping surface extending preferably almost across the thickness of a stem portion 12, so that the stem cross-section is approximately triangular. The result is that the ratio between the length along the slide fastener occupied by the high points from the center line of the fastener to the corners 30 and the length along the fastener of the portion occupied by the lower points is infinitely low. Such terms as "upwardly" and "downwardly" are used for convenience only because obviously the fastener will operate the same way in any oriented position.

It will now be observed that when the slider has been moved to the desired position in closing the fastener and the lock released, it will automatically spring into locking position without any risk of skipping from one fastener element to the next. Thus, wherever the locking member 22 is released, the locking prong 23 or 23a will

I claim:

1. In a slide fastener, a pair of stringers having rows of uniformly spaced molded plastic fastener elements along their adjacent edges, a slider mounted on said elements and movable downwardly to open the fastener and upwardly to close the fastener, said slider being of the locking type with a spring-pressed locking prong adapted to enter between two adjacent fastener elements; the improvement which consists of a specially shaped portion of each fastener element in line with the longitudinal path of said prong as the slider moves along the fastener; such portion presenting an upwardly facing perpendicular surface extending transversely of the fastener for positive locking engagement with said prong, the outer surface of such portion sloping from a comparatively sharp corner at said perpendicular surface immediately inwardly and downwardly toward the next adjacent fastener element so that the ratio between the high points of the fastener elements and the lower points is infinitely low, resulting in maximum ease of entry of said prong into locking position between the fastener elements.

References Cited

UNITED STATES PATENTS

| 1,775,418 | 9/1930 | Blair | 24—205.13 |
| 2,274,723 | 3/1942 | Morin | 24—205.14 |
| 2,322,826 | 6/1943 | Carlile | 24—205.14 |
| 2,502,055 | 3/1950 | Marinsky | 24—205.14 |
| 3,052,939 | 9/1962 | Johns | 24—205.14 |

FOREIGN PATENTS 477,896   1/1938   Great Britain.

BERNARD A. GELAK, Primary Examiner

U.S. Cl. X.R.

24—205.14